United States Patent [19]

Basmajian

[11] 4,087,927

[45] May 9, 1978

[54] WIND POWER DEMONSTRATION APPARATUS

[75] Inventor: Vahan V. Basmajian, Billerica, Mass.

[73] Assignee: Megatech Corporation, Billerica, Mass.

[21] Appl. No.: 770,906

[22] Filed: Feb. 22, 1977

[51] Int. Cl.² .......................... G09B 25/00; F03D 9/00
[52] U.S. Cl. ........................................... 35/13; 73/147; 290/55
[58] Field of Search ...................... 35/10, 13, 19 R, 49, 35/50, 51; 73/147, 148; 290/44, 55

[56] References Cited

U.S. PATENT DOCUMENTS

| 1,889,378 | 11/1932 | Roth | 35/13 |
| 1,968,382 | 7/1934 | Fales | 73/147 |
| 2,269,035 | 1/1942 | Neal | 35/13 |
| 3,082,546 | 3/1963 | Van Baerle | 35/10 |
| 3,883,750 | 5/1975 | Uzzell | 290/55 |

Primary Examiner—William H. Grieb
Attorney, Agent, or Firm—Charles Hieken

[57] ABSTRACT

Wind power demonstration apparatus comprises a windmill assembly comprising a windmill propeller and motor driven fan in a common shroud, and electrical powered generator drivingly coupled to the propeller, parameter adjusting means, and output adjusting and measuring means to provide a compact, economical demonstrator of wind powered operation of a generator and energy conversion.

7 Claims, 2 Drawing Figures

U.S.Patent  May 9, 1978  4,087,927

WIND POWER DEMONSTRATION APPARATUS

BACKGROUND OF THE INVENTION

The present invention relates to education and demonstration apparatus and more particularly to an instrument for demonstrating the principles of wind powered generation of electricity and its control. The invention is particularly characterized in the provision of an economical compact apparatus for effectively demonstrating the interrelated effects of wind conditions and loading conditions.

Fundamentals of power generation are widely taught in high school, college and vocational training curricula.

It is an important object of the invention to demonstrate the principles of power generation from wind power for such educational purposes.

It is a further object of the invention to provide compact, economical demonstration apparatus consistent with the preceding object.

It is a further object of the invention to provide for student safety consistent with one or more of the preceding objects.

It is a further object of the invention to provide highly visual and easily understood demonstration apparatus consistent with one or more of the preceding objects.

SUMMARY OF THE INVENTION

In accordance with the invention, the demonstration apparatus comprises a drivable wheel comprising a windmill propeller mounted on a shaft. This apparatus is responsive to wind to turn the shaft which can drive an electric generator. A source of wind to drive the propeller is provided in the demonstration apparatus.

An instrument containing an electrical generator is also provided in the apparatus. The generator shaft is drivingly coupled to the windmill propeller. Preferably, the generator is housed in an instrument chassis and a generator control circuit is contained in the chassis and includes means for adjusting generator field current and for adjusting load current of the generator's armature. Ammeters are also provided for measuring generator field current and armature current. Armature voltage is also measured and displayed and the generator output is switchable between internal load and external output terminals allowing alternative loads to be provided for increasing the flexibility of the apparatus in making a wide variety of demonstrations.

The user of the apparatus can adjust the wind conditions, by adjustment of the wind source and see the windmill propeller slow down or speed up. He can also see the effect of changes of turbine operating condition on generator armature current under various internal or external load conditions established by him. He can see the basic principles of power generation in action.

Other objects, features and advantages of the invention will be apparent from the following detailed description of preferred embodiments thereof, in which,

DETAILED DESCRIPTION OF PREFERRED EMBODIMENTS

Figure 1:
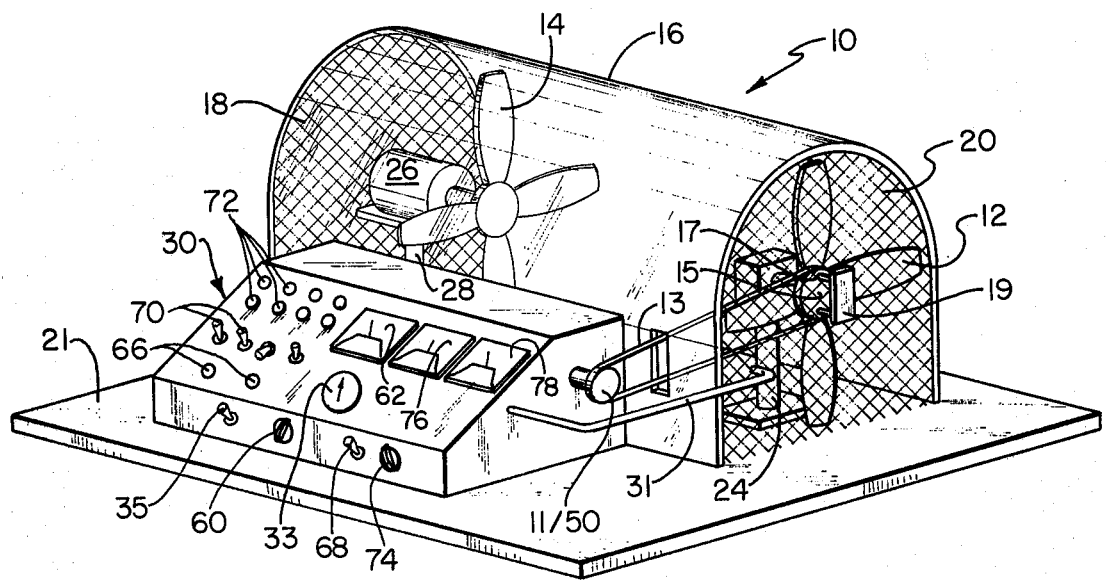
FIG. 1 is an isometric view of windmill demonstration apparatus in accordance with a preferred embodiment of the invention and FIG. 2 is an electrical circuit diagram for the FIG. 1 apparatus.

Referring now to FIG. 1, a windmill demonstration apparatus 10 in accordance with a preferred embodiment of the invention comprises a windmill propeller 12 and a fan propeller 14 contained in a housing 16 having screen end covers 18 and 20. While the shroud is shown as transparent in FIG. 1, it will be understood that it is typically opaque. The propeller 12 is drivingly coupled to an electric generator (not shown) mounted within an instrument chassis via a generator shaft 11, belt 13 and propeller hub 15. A post 24 mounts propeller 12. Electrical induction motor 26 for driving fan 16, is mounted on a post 28 and field coils are indicated at 26C.

The instrument chassis 30 is mounted on a common plate 21 with propeller 12 and motor 26. Instrument chassis 30 contains controls for motor 26.

A locking device 19 contains spaced pins for insertion (via screen 20) into corresponding spaced holes 17 of hub 15.

Figure 2:
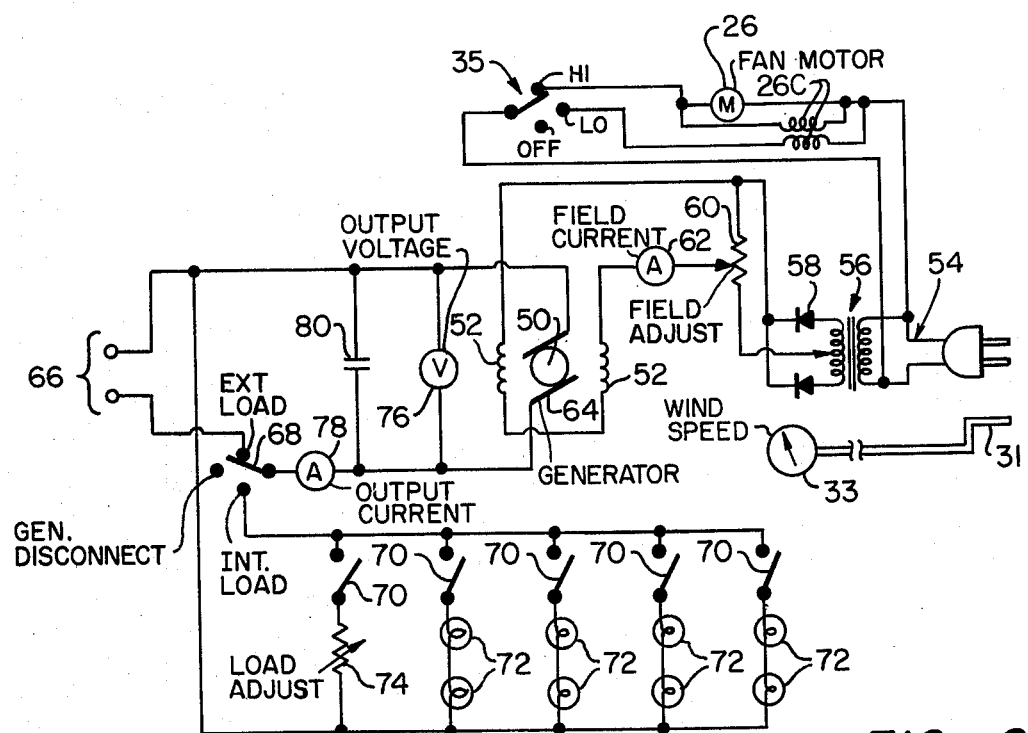

Referring now to FIG. 2, the control and load circuits within chassis 30 comprise an armature 50 of said generator and separately wound field coils 52 therefor powered by a line cord 54 via a transformer 56, rectifier 58 and potentiometer 60. An ammeter 62 in the field circuit measures field current. Voltage developed across the commutator brushes 64 of the armature 50 may be applied to external power output terminals 66 or selectively, via a switch 69, applied to an internal load circuit comprising multiple switches 70 and a plurality of fixed resistance loads 72 (e.g., lamps) and a variable resistance load 74 (e.g., a rheostat). A voltmeter 76 and ammeter 78 are provided in the armature circuit and capacitor 80 protects the voltmeter 76. The variable resistor controls switches. The meters as they appear to the user are indicated on the chassis' face in FIG. 1.

A wind speed measuring probe 31 can be inserted at various points of the wind flow cross section and the wind meter face appears at 33 on the instrument chassis.

The fan 16 may be operated at high and low speeds, typically 1750 and 1140 rpm, respectively, to provide average wind speeds of 2000 and 1100 feet per second, respectively (or greater or lower depending on blade pitch settings).

With the wind generator on at sufficient force to cause the driven windmill propeller to turn, the field adjust control (potentiometer) 60 is slowly increased until output voltage (measured and displayed at 76) is steady. This indicates that the windmill speed has stabilized. Then internal loads are connected to the generator via switches 68 and 70 and rheostate 74. The voltmeter 76 reading should be allowed to stabilize after each increment of load addition. Similarly external loading can be applied via switch 68 and jacks 66.

The student and teacher can work through several significant learning demonstrations, e.g.:

(a) effect on generator voltage and current of high and low speed operations of fan 16, (b) effects of different levels of internal and external loading, (c) correlation of wind speeds to electrical reading observations of (a) and (b).

The wind speed measurements are made with the windmill propeller locked in a 45° position (relative to its supporting post).

The observations and data recorded from such observations can be applied to calculate generator power output (armature or "output" voltage times current) at high and low fan speeds (and the ratio of such powers).

It is evident that those skilled in the art, once given the benefit of the foregoing disclosure, may now make numerous other uses and modifications of and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Wind power demonstration apparatus comprising,
   means defining a driven wheel for rotating in response to impingement of a driving wind thereon, the wheel construction comprising a driven propeller,
   means defining a shroud for enclosing the driven wheel having apertured ends for allowing air to flow through said shroud while restricting access to said propeller,
   means defining a wind generator within the shroud for blowing wind against the blades,
   said wind generator comprising a driving propeller,
   said apparatus having an electrical generator mechanically coupled to said driven propeller,
   means defining a control instrument chassis mounting a generator load circuit therein electrically coupled to said electrical generator,
   means for mounting the driven wheel, wind generator and shroud from said chassis,
   means defining at least one generator output measuring instrument coupled to said electrical generator mounted on said chassis and having a viewable display for displaying the generator output.

2. Wind power demonstration apparatus in accordance with claim 1 and further comprising chassis mounted means for adjusting generator field current.

3. Wind power demonstration apparatus in accordance with claim 1 wherein said generator output measuring instrument measures armature current.

4. Wind power demonstration apparatus in accordance with claim 1 and further comprising means for locking the driven propeller against rotation.

5. Wind power demonstration apparatus in accordance with claim 1 wherein the wind generator driving propeller is substantially the same size and form as the windmill driven propeller and is mounted in opposing relation thereto.

6. Wind power demonstration apparatus in accordance with claim 5 wherein the two propellers are mounted on high vertical posts.

7. Wind power demonstration apparatus in accordance with claim 1 and further comprising means for measuring wind speed at multiple points in the cross section area of wind flow produced by the wind generator.

* * * * *